April 27, 1937. C. B. SEGOVIA 2,078,737
AUTOMATIC FRUIT JUICE EXTRACTOR
Filed Nov. 9, 1935 2 Sheets-Sheet 1

April 27, 1937. C. B. SEGOVIA 2,078,737
AUTOMATIC FRUIT JUICE EXTRACTOR
Filed Nov. 9, 1935 2 Sheets-Sheet 2

WITNESSES
Geo. W. Naylor
A. L. Kitchin

INVENTOR
Crispin B. Segovia
BY
Munn, Anderson & Liddy
ATTORNEYS

Patented Apr. 27, 1937

2,078,737

UNITED STATES PATENT OFFICE 2,078,737

AUTOMATIC FRUIT JUICE EXTRACTOR

Crispin B. Segovia, New York, N. Y.

Application November 9, 1935, Serial No. 49,077

3 Claims. (Cl. 100—39)

This invention relates to an improved device for extracting juice from oranges or other fruit and has for an object to provide a construction which will automatically function.

Another object of the invention is to provide a machine which may have oranges or other fruit fed therein and which will cut and squeeze the orange or other fruit and direct the juice in one direction and the pulp in another direction.

A further object of the invention is to provide a continually operating and automatic machine for receiving fruit, cutting the same into parts, squeezing the same and directing the juice to a desired point and the remaining part to a second point.

An additional object, more specifically, is to provide a machine in which oranges or other fruit may be fed and in which one orange or other fruit may be grasped and brought into engagement with a cutter and then the severed parts into operative engagement with a squeezing device so as to automatically remove the juice from the oranges during the actuation of the machine.

In the accompanying drawings:

Fig. 4 is a view partly in plan and partly in section of a chute and certain other parts, the same being taken on line 4—4 of Fig. 1;

Fig. 5 is a side view of the power transmitting and feeding means for the rotation of parts of the device; and Fig. 6 is an enlarged fragmentary sectional view through Fig. 1, the same being shown in connection with an ejecting cam.

Figure 2:
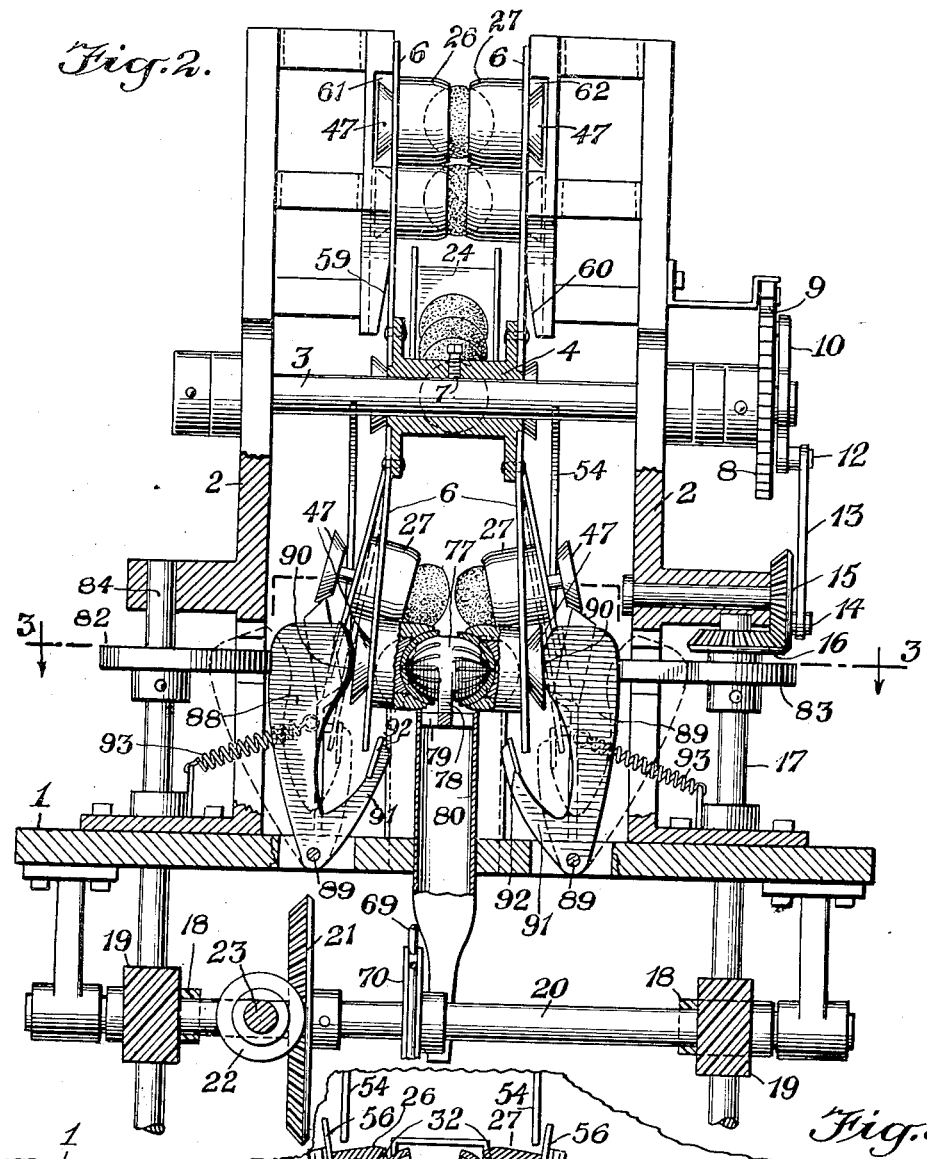
Fig. 2 is an edge view of the machine shown in Fig. 1.

Referring to the accompanying drawings by numeral, 1 indicates a frame which may have suitable uprights and cross pieces whereby the various moving and other parts of the device may be supported. The frame 1 is formed with a pair of uprights 2 which supports the rotating shaft 3. This shaft extends through the hub 4 of what may be termed a feeding wheel 5. The wheel 5 has not only the hub, but a number of pairs of spokes 6, said spokes being flexible substantially in a direction parallel to the axis of axle 3. The hub 4 is rigidly secured to the axle 3 by any suitable means, as, for instance, the set screw 7. By reason of this structure whenever the shaft 3 rotates, the feeding wheel 5 will also rotate. A ratchet wheel 8 is rigidly secured to the shaft 3 as shown in Figs. 2 and 5. A fixed pawl 9 coacts with the ratchet wheel 8 so as to prevent it rotating in a reverse direction. As shown in the two figures just mentioned, a double ended arm 10 is pivotally mounted on shaft 3, one end carrying a spring pressed pawl 11, which engages the teeth of ratchet wheel 8 while the opposite end is connected by pin 12 with a link 13, which link is connected by a wrist pin 14 to the pinion 15. Whenever pinion 15 rotates, link 13 will be reciprocated and consequently the pawl 11 will be moved back and forth and as it moves to the left in Fig. 5 it will partially rotate wheel 8 and shaft 3. As the parts are proportioned each rotation of pinion 15 will move shaft 3 one-eighth of a revolution.

Figure 3:
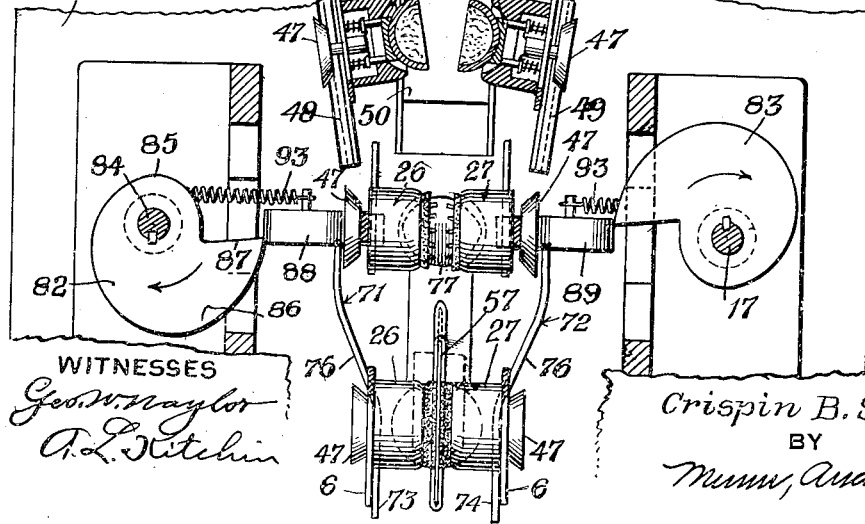
Fig. 3 is a fragmentary view taken on line 3—3 of Fig. 2.

As indicated particularly in Fig. 2, the bevel pinion 15 meshes continually with the bevel gear 16 rigidly secured with shaft 17 which is connected by spiral gears 18 and 19 with the driving shaft 20. This driving shaft carries a large gear 21 which continually meshes with the small gear 22 which receives power from electric motor or other prime mover through shaft 23. Ordinarily, during the actuation of the device shaft 23 is continually rotating and consequently the parts continue to function, though the feed wheel 5 will move intermittently. As indicated on the drawing, there are eight pairs of arms or spokes 6, but it will be evident that the parts could be proportioned so that a less number or greater number could be used. An orange gripping device is carried by each of the arms 6 and as they move past the feeding chute 24 they grip an orange and carry it forward intermittently until it has passed the squeezing device. The various gripping devices 25 are formed in two parts, namely, parts 26 and 27 as shown in Fig. 3. As these two parts are identical in construction, the description of one will apply to both. In Fig. 6, a detailed view is shown of part 27 of the gripping device. This is connected to one of the arms 6 by suitable screws 6'.

It will be noted from Fig. 6 that the gripping device is provided with what may be termed a rigid body 28 having cutaway portion of chamber 29 and a cup-shaped portion 30 into which the orange is fed. A number of small pointed protuberances 31 are provided in the cup-shaped recess 30 so that the orange may be properly gripped and held against shifting movement during the actuation of the device. An ejecting block 32 is slidingly mounted in the body 28 but when the parts are in position as shown in Fig. 6 an orange may be properly held in the gripping device, but when the parts are as shown in the upper part of Fig. 3 the orange is being ejected. Tubular members 33 and 34 are threaded into the ejector block 32 and are guided by pins 35 and 36 screwed into arm 6. Springs 37 and 38 surround the pins 35 and 36 and act to normally hold the block 32 substantially in the position shown in Fig. 6. Each of the tubular members 33 and 34 is provided with an enlarged head against which the springs rest and also to which the flexible cables 39 and 40 are secured. These cables pass over a tubular member 41 secured on arm 6 and to the enlarged head 42 of the ejecting shaft 43. A spring 44 normally holds the shaft 43 and associated parts in the position shown in Fig. 6. The shaft 43 is provided with enlarged end 45 having a threaded bore for receiving the screw 46 which acts to clamp the bevel wheel 47 in place. When the ejecting mechanism is to function, the parts are moved to the position shown in the upper part of Fig. 3 whereupon the bevel parts of the respective wheels 47 engage the respective cams 48 and 49 which act to pull the shaft 43 to the right as shown in Fig. 6, whereupon the flexible cables 39 and 40 will pull the tubular members 33 and 34 so as to move the block or plate 32 outwardly and to substantially the position shown in the upper part of Fig. 3. This will force the orange or orange skin off of the protuberances 31 and by reason of the smooth surface of block 32 and the relative position of the parts will permit the orange skin, pulp, and the like to drop down by gravity into the chute 50. This chute may direct the orange skin and pulp to any desired point.

Figure 1:
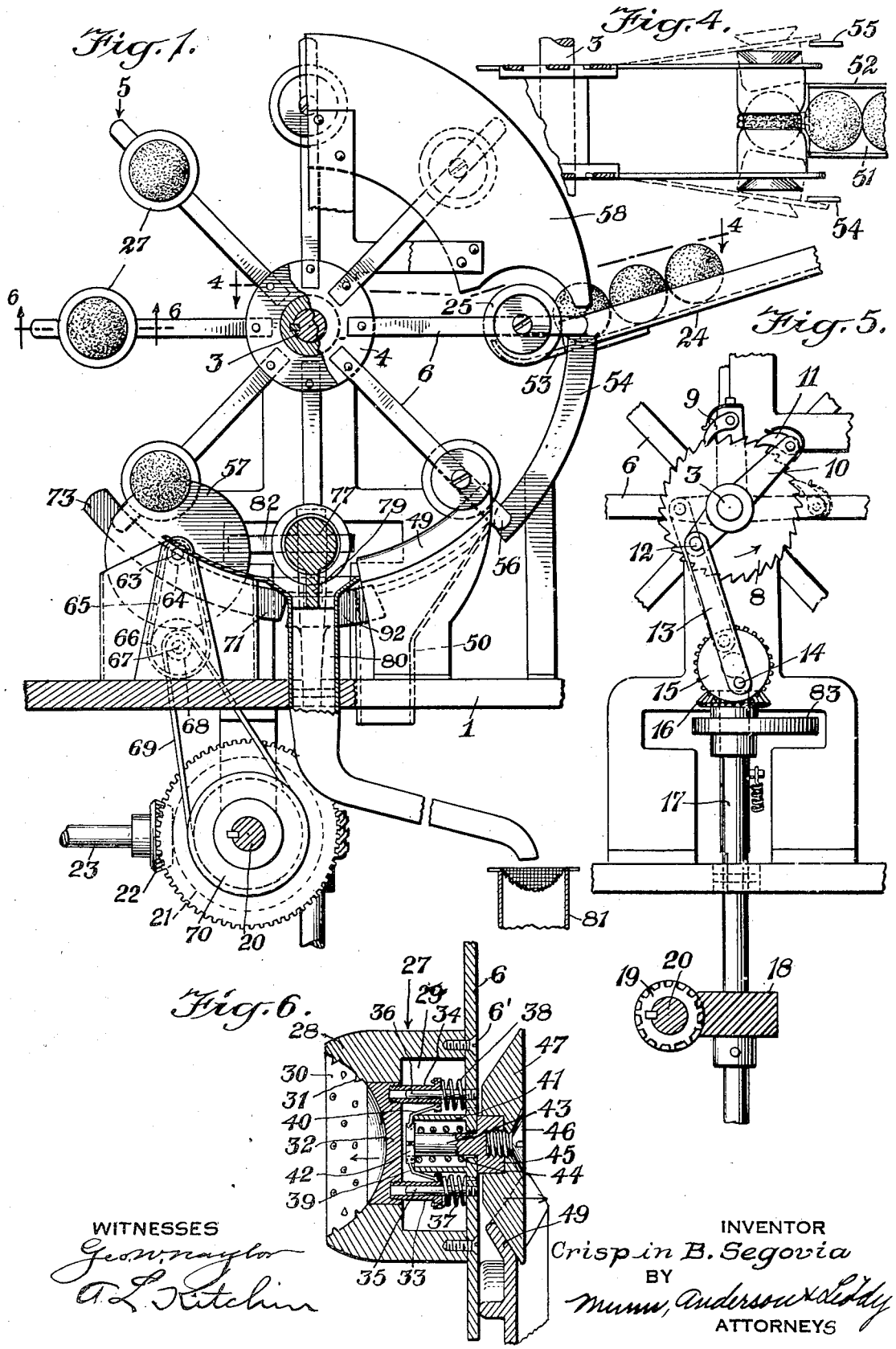
Fig. 1 is a side view of a machine disclosing an embodiment of the invention, a portion being broken for better illustrating the construction.

As shown in Figs. 1 and 4, the chute 24 is provided with a bottom 51, side walls 52, and a small extension 53 which projects into the feeding wheel 5 as shown in Fig. 1. Arranged adjacent and principally below the chute 24 are spreading cams 54 and 55 positioned to receive the outer end portions 56 of the respective arms 6 as they leave the cams 48 and 49. During the further operation of the device, the arms are maintained spread apart as indicated in dotted lines in Fig. 4 until they come opposite the chute 24. At the moment they come opposite the chute, the outer ends 56 move off of the cams 54 and 55 and consequently the gripping members 26 and 27 will quickly move toward each other to grip an orange as indicated in full lines in Fig. 4. After the orange has been gripped, it is moved intermittently around until it reaches the disk cutter 57. As indicated in Fig. 2, the casing 58 is provided with bevel portions 59 and 60 which are positioned to engage the outer end portion 56 of the arms 6 so as to force the same toward each other and thereby cause the protuberances 31 to be pressed into the orange whereby a good gripping action is secured. The casing 58 may cover half or more of the wheel 5 though it may present only a quarter of a circle as shown in Fig. 1.

In addition to having the squeezing cams 59 and 60, the casing 58 is provided with grooves 61 and 62 whereby the bevel wheel 47 may freely move without functioning at this time. After an orange has been gripped as just described, it is moved for a little over a half revolution by wheel 5 before it engages the cutter 57, it being understood that as shown in Fig. 1 the wheel 5 moves counter-clockwise. It will also be evident that the orange must be cut and then squeezed in order to remove the juice and means must be provided for directing the juice to a desired point and the skin and pulp to a second point. As indicated particularly in Figs. 1 and 3, the rotary knife 57 is positioned to cut the orange centrally without striking the body 28 of the respective gripping members 26 and 27. The cutting disk 57 is supported by a shaft 63 which preferably carries a small sprocket wheel 64 so as to accommodate the driving sprocket chain 65 which passes around a large sprocket 66. The sprocket 66 is secured to a shaft 67 which carries a pulley 68 accommodating the belt 69, which belt passes around the large pulley 70, said large pulley being rigidly secured to shaft 20. If desired, instead of having a pulley and belt sprocket wheels and sprocket chain could be used. By this means, whenever shaft 20 is being rotated, the cutter 57 will be rotated and at a comparatively high rate of speed.

Adjacent the cutter 57, there are provided cams 71 and 72. These cams are positioned so that the respective ends 73 and 74 (Figs. 1 and 3) will be closer together than the end portion 56 of arm 6 so that these arms will readily pass over the outside of the cams 71 and 72. These cams are parallel for part of the length, namely, a sufficient length to permit the orange to be completely cut before the end portions 56 of arm 6 engage the inclined portions 75 and 76. When this happens, the arms 6 are spread apart more and more until they are moved apart sufficiently to permit the respective halves to move opposite to the respective ends of the squeezing block 77, which block is supported by a standard 78 preferably formed integral with a spider 79. The spider is secured in any manner to the juice discharge tube 80. This tube is preferably reduced at the lower end and directs the juice to a suitable container 81. As soon as the squeezing members 26 and 27 with the respective halves of the orange come opposite the queezing head or block 77 the ends of the arm 6 will slide off of the cams 71 and 72 and whereupon the members 26 and 27 will move against the block or head 77. The resilient action of the arms 6 is not sufficient to cause the proper squeezing of the orange as shown at the center of Fig. 3. In view of this fact, there are provided squeezing cams 82 and 83 which are formed identical so that the description of one will apply to both. These cams are secured to the respective driving shafts 84 and are provided with substantially semi-circular parts 85 and with an offset 87. These cams act upon squeezing arms 88 and 89. As these are identical, the description of one will apply to both.

In Fig. 2 it will be seen that arm 88 is pivotally mounted at 89 to the frame 1, and has a functioning surface 90 which is pressed against the wheel 47 by cam 82 whereby the member 26 is moved over to secure a desired squeezing action for the orange. It will be understood that the other half of the orange will be squeezed in a similar manner. The squeezing arm 88 is provided with an auxiliary arm 91 on which is mounted a cam 92. A spring 93 is secured to a fixed point on the frame and to a point on the arm 88. This spring is a retractile spring and when the parts are in the position shown in Figs. 2 and 3 it is under tension. When cam 82 slips off arm 88, spring 93 will quickly swing arm 88 over to the dotted position shown in Fig. 2 and cam rail 92 will engage the arm 6 and swing the same outwardly so as to pull the members 26 and the orange skin and pulp from the squeezing head 77. As soon as this occurs, the wheel 5 will begin to move and will move a distance of one-eighth of a revolution. This movement will cause the parts to move to a position whereby the wheels 47 will move along the cams 48 and 49 thereby causing the ejecting mechanism to function as heretofore described. As soon as the wheels 47 move off the cams 48 and 49, the arms 6 will automatically, by their own resiliency, move onto the cams 54 and 55 and remain spread until they move off these cams at the upper end thereof. Substantially at the same time, the end of the arm 6 which has just had an orange skin released therefrom will engage the respective cams 54 and 55 and be maintained spread as the wheel 5 continues to move. It will thus be seen that upon each one-eighth of a revolution, one orange is received and one orange is squeezed. The respective gear wheels and other parts are proportioned to secure this result and after the device has been set up and put in working condition it is merely necessary to turn on the power and then feed the oranges or other fruit down the chute 24. If, for any reason, an orange is not deposited in each of the gripping structures as they pass the chute, no harm will be done, but the various mechanisms will function in the same way as if an orange had been inserted.

I claim:

1. In an orange squeezer, means for gripping and holding the cut oranges, means for squeezing the juice from said oranges, said means including a pair of spaced members, a stationary squeezing head, and means for forcing cut oranges against said squeezing head, each of said spaced members having a recess provided with protuberances for gripping an orange and means for ejecting the orange, said ejecting means including a sliding ejecting plate, a pair of members extending from said ejecting plate, a pair of cables for actuating said members extending from said ejecting plate, a shaft for actuating said cables, a beveled wheel connected with said shaft and a stationary cam acting on the bevel wheel for moving the same to cause said shaft to function to pull said cable as said feed wheel moves.

2. An orange squeezer, including a feed wheel having a plurality of pairs of arms, an orange gripping structure associated with each pair of arms, means for halving the oranges while held by said orange gripping structure, a stationary orange squeezing head, means for spreading the arms of the feeding wheel as they approach said squeezing head, a power actuated means for moving the orange gripping structure toward said head after said gripping structure is moved to a position opposite the head whereby the halved oranges will be forced against said head, said power actuating means acting to move said orange gripping structure laterally away from said squeezing head after the squeezing operation, a pair of ejecting structures carried by said orange gripping structure, and a pair of stationary cams positioned to cause the actuation of said ejecting structures as said feed wheel moves a squeezed orange away from said head.

3. A device for squeezing fruit comprising a rotating feed wheel formed with pluralities of pairs of radiating arms, an orange receiving cup on each of said arms arranged to form pairs, the cups of each pair of arms facing but not contacting, means for feeding fruit to said pairs of cups, means for intermittently rotating said wheel, a cutter positioned so that as said wheel rotates the respective cups of each pair of cups will pass on opposite sides of the cutter whereby the fruit in said pairs of cups will be cut into halves as the cups pass the cutter, means for moving the respective cups of each pair of cups toward each other after the cups have passed the cutter, a squeezing head positioned to engage the orange halves as said cups are moved toward each other, means for moving the cups apart after the squeezing operation, a pulp ejector carried by each of said cups, and means for causing said ejectors to function after the cups have moved away from said squeezing head.

CRISPIN B. SEGOVIA.